US005838527A

United States Patent [19]

Lawrence et al.

[11] Patent Number: 5,838,527

[45] Date of Patent: Nov. 17, 1998

[54] ELECTRICAL SURGE PROTECTION APPARATUS

[76] Inventors: Zachary Andrew Lawrence, 10930 Squashbush Loop, Peyton, Colo. 80831; Laurence Everett Buckridge, 11871 E. Buckhorn Way, Franktown, Colo. 80116

[21] Appl. No.: 841,119

[22] Filed: Apr. 29, 1997

[51] Int. Cl.[6] ........................ H02H 1/00

[52] U.S. Cl. ........................ 361/119; 361/111; 333/110; 333/116

[58] Field of Search ........................ 361/117, 119, 361/120, 123, 126–128, 56, 111, 113; 333/109–110, 115–116

[56] References Cited

U.S. PATENT DOCUMENTS

| | | |
|---|---|---|
| 781,625 | 1/1905 | Stone . |
| 3,030,550 | 6/1962 | Smeltzer . |
| 4,110,570 | 8/1978 | Foster . |
| 4,199,736 | 4/1980 | McTaggart et al. . |
| 4,282,555 | 8/1981 | Svedberg . |
| 4,359,764 | 11/1982 | Block . |
| 4,409,637 | 10/1983 | Block . |
| 4,554,608 | 11/1985 | Block . |
| 4,698,721 | 10/1987 | Warren .................... 361/110 |
| 4,907,119 | 3/1990 | Allina .................... 361/56 |
| 4,985,800 | 1/1991 | Feldman et al. .................... 361/113 |
| 5,109,204 | 4/1992 | Keefer .................... 333/81 A |
| 5,124,873 | 6/1992 | Wheeler et al. .................... 361/58 |
| 5,204,799 | 4/1993 | Stibila . |
| 5,208,723 | 5/1993 | Jenne . |
| 5,323,289 | 6/1994 | Longsdorf et al. . |
| 5,424,694 | 6/1995 | Maloratsky et al. .................... 333/112 |
| 5,426,556 | 6/1995 | Lee et al. . |
| 5,467,063 | 11/1995 | Burns et al. .................... 333/125 |
| 5,625,328 | 4/1997 | Coleman, Jr. .................... 333/116 |
| 5,666,255 | 9/1997 | Muelleman .................... 361/111 |

*Primary Examiner*—Jeffrey A. Gaffin
*Assistant Examiner*—Michael J. Sherry
*Attorney, Agent, or Firm*—Dale B. Halling

[57] ABSTRACT

A surge protection apparatus (20) has a first quadrature coupler (22) with a first input (24) coupled to an electrical ground (26), and a second input (28) connected to an input signal. A second quadrature coupler (34) having a third input (32) is coupled to a first output (30) of the first quadrature coupler (22). A fourth input (38) is coupled to a second output (36) of the first quadrature coupler (22). A third output (40) is coupled to a signal port and a fourth output (42) is coupled to the electrical ground.

18 Claims, 5 Drawing Sheets

ELECTRICAL SURGE PROTECTION APPARATUS

FIELD OF THE INVENTION

The present invention relates generally to the field of electronic devices and more particularly to an electrical surge protection apparatus.

BACKGROUND OF THE INVENTION

Electronic equipment used in radio towers, cellular telephone base stations and cable telephone plants are sensitive to electrical surges, such as lightning strikes. When a lightning bolt hits a radio (microwave) frequency transmission line, the electronic equipment attached to the transmission line is subject to a several thousand volt electrical spike (surge). To prevent these electrical surges from destroying the attached electronic equipment, electrical surge protectors are inserted along the transmission line. Typical prior art electrical surge protectors are gas discharge devices. These gas discharge devices are inserted between electrical ground and the signal carrying conductor. When a large electrical surge occurs, the voltage is applied to the gas discharge device. At a selected voltage the gas ionizes and allows the voltage to drain to ground. Unfortunately, these devices typically require 750 Volts before the gas ionizes. This means that the electronic equipment behind the surge protector must be able to withstand 750 volts.

Another solution has been to use quarter wave stubs. A quarter wave stub is a conductor that has an electrical path length equal to a quarter wave of the desired transmission frequency. The quarter wave stub is connected between the signal carrying conductor and ground. For the desired signal, the quarter wave stub appears to be an electrical open. However, for signals at other (low) frequencies (e.g., lightning) the electrical stub appears to be a short to ground. When a lighting strike hits a transmission line with a quarter wave stub, the electrical surge is shunted to ground. Unfortunately, the electrical resistance of the quarter wave stub results in about 150 volts across the quarter wave stub. This 150 volts is seen by the electronic equipment and still results in an interruption in the operation of the electronic equipment.

Thus there exists a need for an electrical surge apparatus that reduces the voltage applied to electronic equipment when a lightning strike or electrical surge occurs.

SUMMARY OF THE INVENTION

A surge protection apparatus that overcomes these and other problems has a first quadrature coupler with a first input coupled to an electrical ground, and a second input connected to an input signal. A second quadrature coupler having a third input is coupled to a first output of the first quadrature coupler. A fourth input is coupled to a second output of the first quadrature coupler. A third output is coupled to a signal port and a fourth output is coupled to the electrical ground.

DETAILED DESCRIPTION OF THE DRAWINGS

Figure 1:
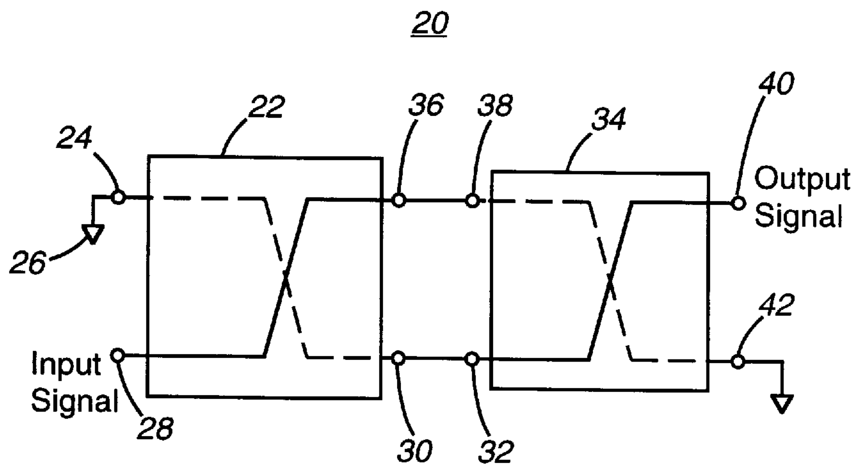
FIG. 1 is a schematic diagram of an electrical surge protection apparatus according to the invention.

An electrical surge protection apparatus 20 according to the invention is shown in FIG. 1. A first quadrature coupler 22 has a first input 24 coupled to electrical ground 26. A second input 28 is coupled to the input signal. A first output 30 of the first quadrature coupler 22 is connected to a third input 32 of a second quadrature coupler 34. A second output 36 of the first quadrature coupler 22 is connected to a fourth input 38 of the second quadrature coupler 34. A third output 40 of the second quadrature coupler 34 is connected to a signal port (output signal port). A fourth output 42 is connected to electrical ground. In one embodiment the first output 30 and the third input 32 have a dielectric covering and the second output 36 and the fourth input 38 also have a dielectric covering.

A desired RF (microwave) signal passes directly from the input port 28 to the output port 40. When an electrical surge (e.g., lightning) is applied to the apparatus 20 the surge passes directly to output port 42 and is coupled to ground. As a result, the voltage applied to the output port 40 due to an electrical surge is 10 volts or less. In addition, quadrature couplers have very low insertion losses. As a result the desired signal is not appreciably attenuated by the surge protection device 20. In one embodiment the quadrature couplers are hybrid quadrature couplers. All types of couplers and quadrature couplers are contemplated by the invention, including quadrature hybrids, waveguide tees, Wilkenson couplers, equal phase dividers and transformer tees. In addition, the invention contemplates the use of signal frequencies from acoustical frequencies to light frequencies.

Figure 2:
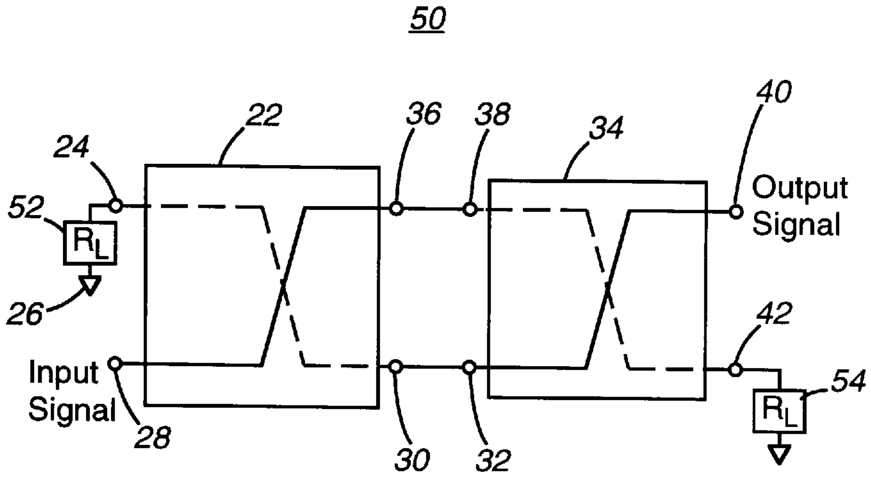
FIG. 2 is a schematic diagram of another embodiment of an electrical surge protection apparatus according to the invention.

FIG. 2 is another embodiment of an electrical surge protection device 50. The device 50 includes the pair of quadrature couplers 22, 34 connected in the same manner as shown in FIG. 1. In this case a matched load (reactive load) 52 is connected between the first input 24 and ground 26 and another reactive load 54 is connected between the fourth output 42 and ground. The reactive loads 52, 54 when matched to the characteristic impedance of the transmission line reduce the voltage standing wave ration (VSWR) of the device 50.

Figure 3:
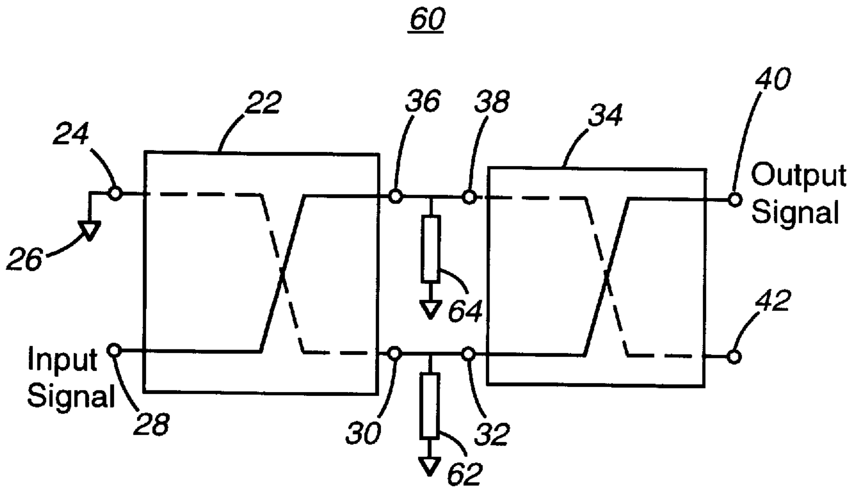
FIG. 3 is a schematic diagram of another embodiment of an electrical surge protection apparatus according to the invention.

FIG. 3 shows another embodiment of an electrical surge protection device 60. In this embodiment a pair of quarter wave stubs 62, 64 are connected between the first output 30 and the third input 32 and the second output 36 and the fourth input 38. The quarter wave stubs 62, 64 further drain the low frequency component of an electrical surge to ground. This reduces the electrical power that the output port 42 has to dissipate. The addition, this does not increase the overall insertion loss from the device shown in FIG. 1. It can be shown mathematically that any balanced devices inserted between the two quadrature couplers 22, 34 are not seen by an external circuit.

Figure 4:
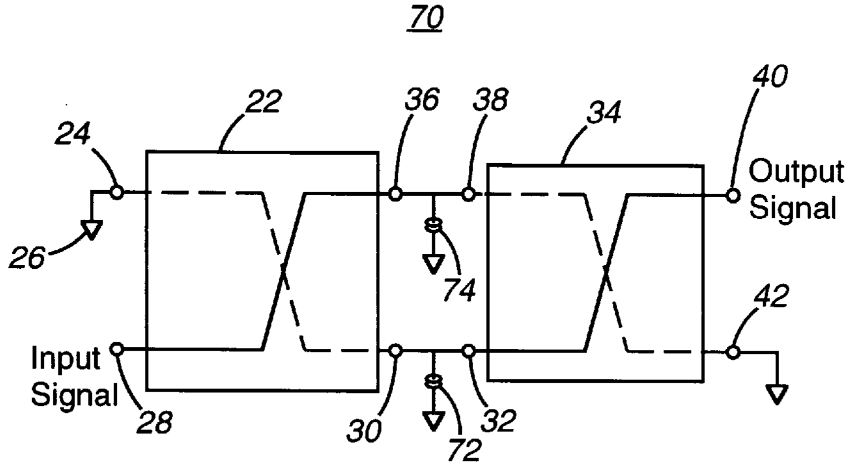
FIG. 4 is a schematic diagram of another embodiment of an electrical surge protection apparatus according to the invention.

FIG. 4 shows another embodiment of an electrical surge protection apparatus 70. In this case the quarter wave stubs 62, 64 are replaced with a matched pair of voltage breakdown devices 72, 74. In one embodiment the voltage breakdown devices 72, 74 are gas discharge devices.

Figure 5:
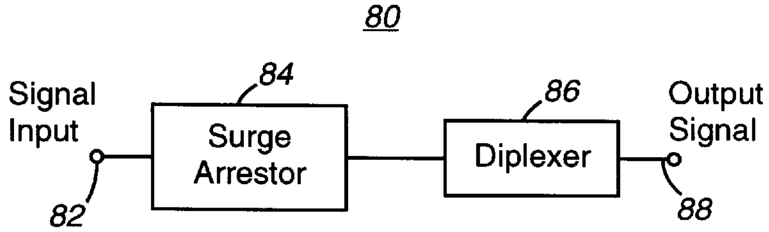
FIG. 5 is a block diagram of another embodiment of an electrical surge protection apparatus according to the invention.

FIG. 5 is a block diagram of another embodiment of an electrical surge protection apparatus 80. The input signal 82 is connected to a surge arrestor 84. The surge arrestor (first stage surge arrestor) 84 significantly reduces any voltage spike. A diplexer 86 then separates the low frequency signals from the high frequency signals of the remaining voltage spike and signal. The high frequency signals are passed through to the output (high frequency output) 88. The low frequency signals are shunted to ground through a low frequency output. Since most electrical surges, such as lightning strikes, only contain frequency components in the low frequency range (less 10 KHz), the electrical surge is effectively shunted to ground. The desired signals typically are in the 100 KHz to 100 Ghz range and are unaffected by the diplexer 86.

Figure 6:
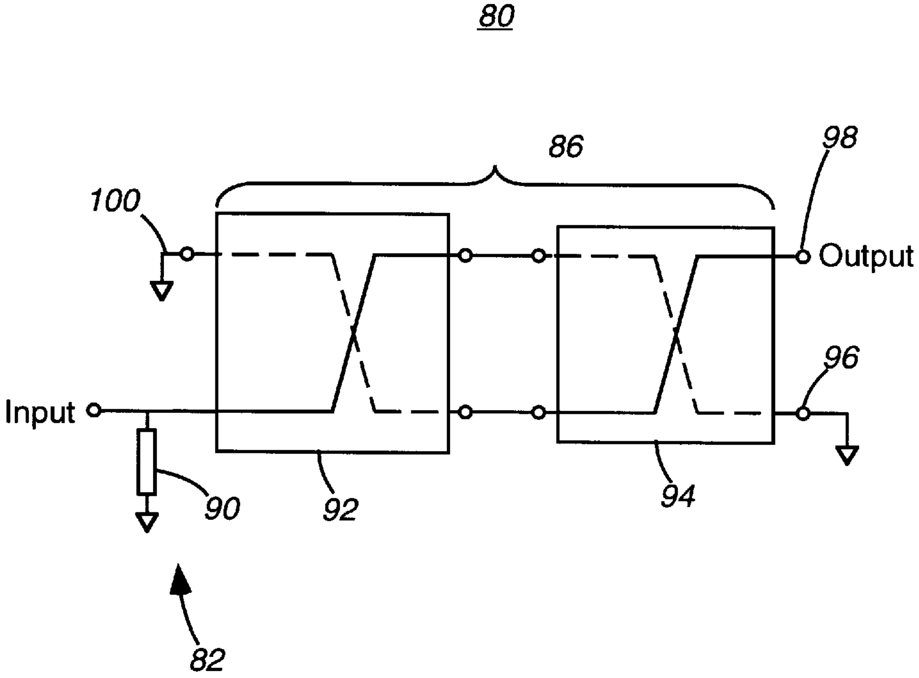
FIG. 6 is a schematic diagram of another embodiment of an electrical surge protection apparatus according to the invention.

FIG. 6 shows an embodiment of the electrical surge protection apparatus 80. In this embodiment, the surge arrestor 82 is a quarter wave stub 90. The quarter wave stub 90 will reduce the voltage of a lightning surge to about 750 Volts. A pair of quadrature couplers 92, 94 are connected together to form the diplexer 86 in this embodiment. The 750 Volts across the quarter wave stub 90 will be connected to ground through a DC (direct current) output port 96 and any high frequency signals will pass through to a signal output port 98. The other input port 100 is connected to ground and any reflections from the diplexer 86 are coupled to the input port 100 and dissipated.

Figure 7:
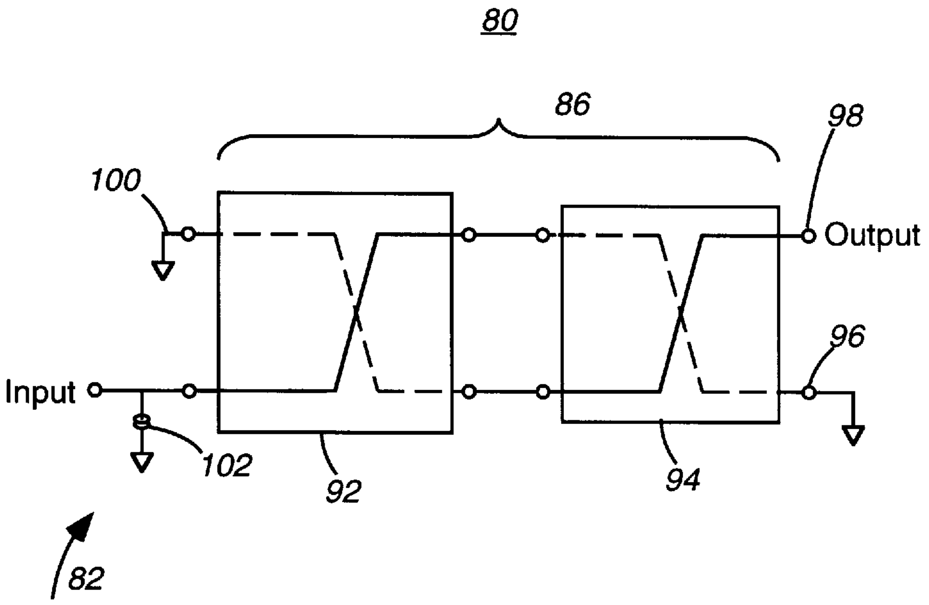
FIG. 7 is a schematic diagram of another embodiment of an electrical surge protection apparatus according to the invention.

FIG. 7 shows another embodiment of the electrical surge protection apparatus 80. In this embodiment, the surge arrestor 82 is a voltage breakdown device 102. The voltage breakdown device 102 can be gas discharge device, however other voltage breakdown devices can also be used.

Figure 8:
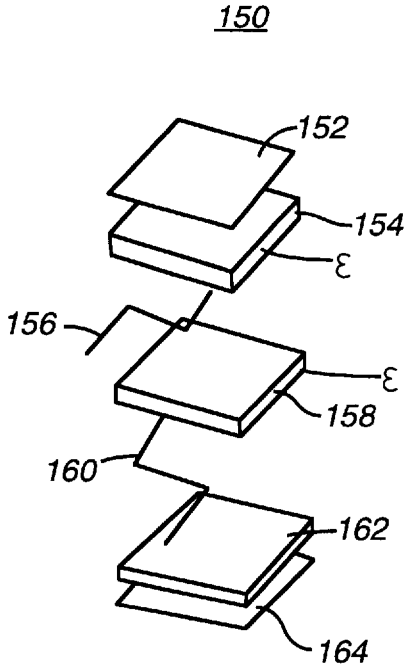
FIG. 8 an exploded view of an electrical hybrid designed to operate as an electrical surge protection apparatus.

FIG. 8 is an exploded view of an electrical hybrid 150 designed to operate as an electrical surge protection apparatus. A first ground plane 152 is placed adjacent to a first dielectric sheet 154. Next a first electrical stripline 156 is placed adjacent to the first dielectric sheet 154. Next a second dielectric sheet 158 is placed adjacent to the first electrical stripline 156. A second electrical stripline 160 is then placed adjacent to the second dielectric sheet 158. A third dielectric sheet 162 is placed adjacent to the second electrical stripline 160. Finally a second ground plane 164 is placed adjacent to the third dielectric sheet 162. When these layers are bonded to each other it forms a hybrid electrical surge protector.

Figure 9:
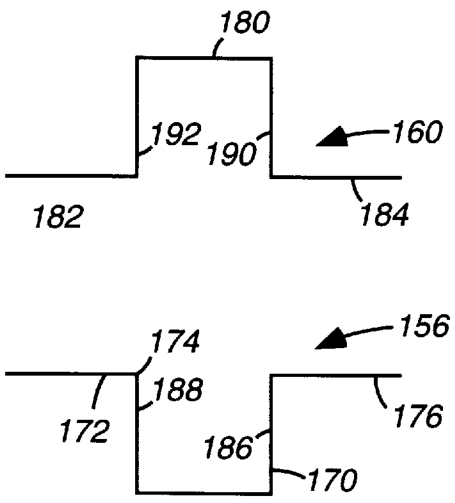
FIG. 9 is a schematic drawing a pair of electrical strip lines used in the electrical hybrid of FIG. 8.

FIG. 9 shows the pair of electrical strip lines 156, 160. The first electrical stripline 156 is U shaped 170 with a first lead 172 extending from a tip 174 of the U shape 170. The first lead extends beyond the first dielectric sheet 154. A second lead 176 extends from a second tip of the U shape and extends beyond the first dielectric sheet.

The second electrical stripline 160 is a mirror image of the first electrical stripline 156. The second stripline 160 is an inverted U shape 180 with a first lead 182 extending from one tip of the inverted U shape and beyond the second dielectric sheet 158. A second lead 184 is connected to the other tip of the inverted U shape and also extends beyond the second dielectric sheet 158. The legs 186, 188 of the U shape are placed over the legs 190, 192 of the inverted U shape 180. A signal input on lead 172 will pass through the hybrid 150 and out of lead 184, when the signal has a wavelength that is four times the length of the leg 188, 186, 190, 192 (all legs have the same length). Signals differing significantly in wavelength from four times the length of the leg 188, 186, 190, 192 (or an odd submultiple thereof) are output on lead 176. In this way low frequency electrical surges can be dissipated by connecting lead 176 to ground.

Figure 10:
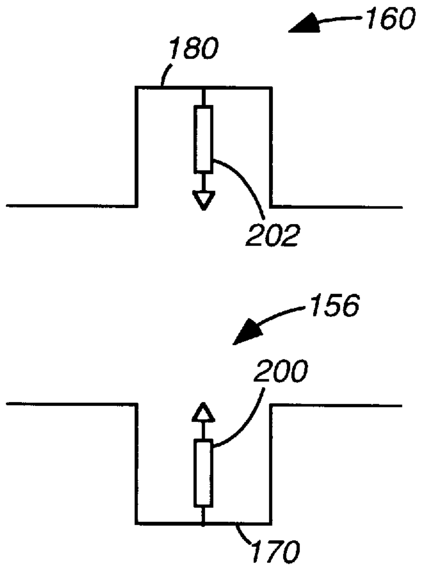
FIG. 10 is a schematic drawing a pair of electrical strip lines and associated circuitry used in the electrical hybrid of FIG. 8.

FIG. 10 shows another embodiment of the electrical striplines 156, 180. In this embodiment a quarter wave stub 200 is electrically connected to the base of the U shape 170. Another quarter wave stub 202 is connected to the base of the inverted U shape 180. The quarter wave stubs 200, 202 are connected to ground and designed to be sandwiched between the dielectric sheets. The quarter wave stubs 200, 202 will shunt any low frequency signals to ground. In addition, if the quarter wave stubs are electrically balanced they will not effect (alter) the VSWR of the hybrid 150.

Figure 11:
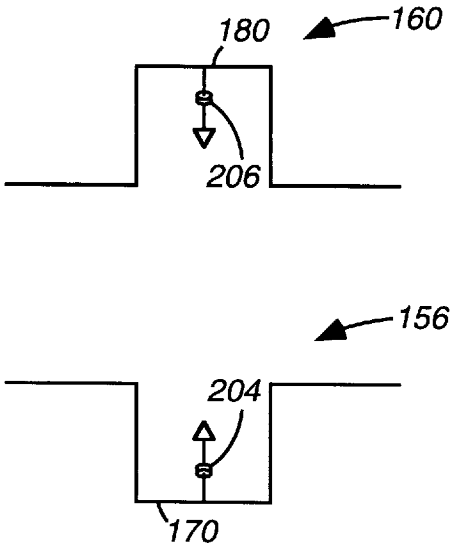
FIG. 11 is a schematic drawing a pair of electrical strip lines and associated circuitry used in the electrical hybrid of FIG. 8.

FIG. 11 is another embodiment of the electrical striplines 156, 180. In this embodiment a voltage breakdown device 204 is electrically connected to the base of the U shape 170. Another voltage breakdown device 206 is connected to the base of the inverted U shape 180. The voltage breakdown devices (voltage breakdown apparatus) 204, 206 can be capacitors with dielectrics that breakdown at certain voltages or zener diodes or active components.

Figure 12:
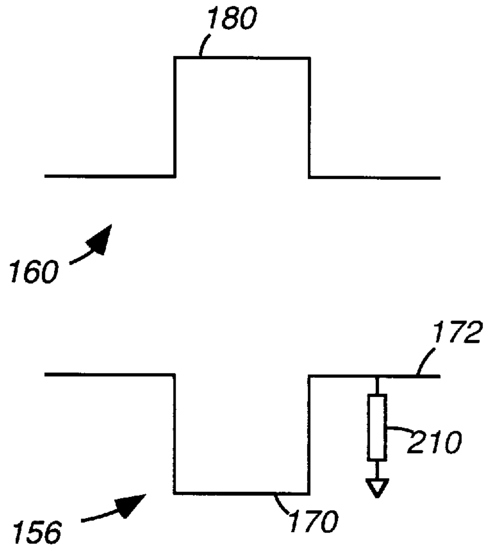
FIG. 12 is a schematic drawing a pair of electrical strip lines and associated circuitry used in the electrical hybrid of FIG. 8.
Figure 13:
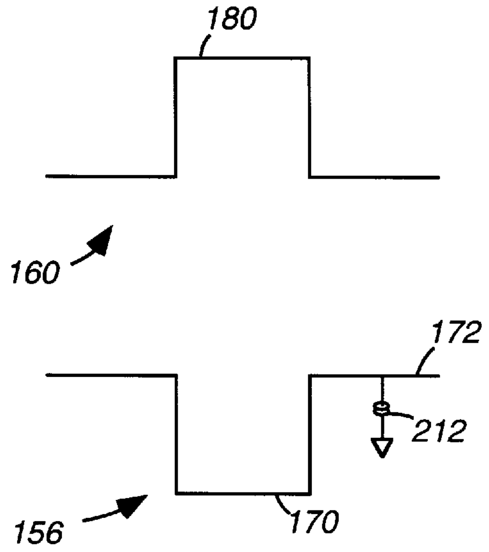
FIG. 13 is a schematic drawing a pair of electrical strip lines and associated circuitry used in the electrical hybrid of FIG. 8.

FIG. 12 is another embodiment of the electrical striplines 156, 180. In this case the electrical stripline 156 includes a quarter wave stub 210 electrically attached to the first lead 172. Again the quarter wave stub 210 shunts any low frequency voltages to ground. FIG. 13 is another variation where a voltage breakdown device 212 is electrically connected to the first lead 172.

Thus there has been described an electrical surge protection device that significantly reduces the voltage applied to electronic equipment when a lightning strike or electrical surge occurs. In addition, the electrical surge protection device has a low insertion loss. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A surge protection apparatus, comprising:

a first quadrature coupler having a first input coupled to an electrical ground, and a second input connected to an input signal; and a second quadrature coupler having a third input coupled to a first output of the first quadrature coupler, a fourth input coupled to a second output of the first quadrature coupler, a third output coupled to a signal port and a fourth output coupled to the electrical ground.

2. The surge protection apparatus of claim 1, wherein the first quadrature coupler is a quadrature hybrid.

3. The surge protection apparatus of claim 1, wherein the second quadrature coupler is a quadrature hybrid.

4. The surge protection apparatus of claim 1, further including a diplexer coupled to the second input.

5. The surge protection apparatus of claim 1, further including a diplexer coupled to the third input and a second diplexer coupled to the fourth input.

6. The surge protection apparatus of claim 1, further including a voltage breakdown apparatus coupled to the second input port.

7. The surge protection apparatus of claim 1, further including a voltage breakdown apparatus coupled to the third input and a voltage breakdown apparatus coupled to the fourth input.

8. The surge protection apparatus of claim 1, further including a dielectric covering the third input and the first output.

9. The surge protection apparatus of claim 1, further including a dielectric covering the fourth input and the second output.

10. An electrical surge protection apparatus, comprising:

a quarter wave stub coupled to a signal; and a diplexer having an input coupled to the quarter wave stub, the diplexer having a high frequency output and a low frequency output coupled to an electrical ground.

11. The electrical surge protection apparatus of claim 10, wherein the diplexer comprises a pair of quadrature couplers, a second of the pair of quadrature couplers having a pair of inputs coupled to a pair of outputs of a first of the pair of quadrature couplers.

12. The electrical surge protection apparatus of claim 11, further including a reactive load coupled to one of a pair of inputs of the first of the pair of quadrature couplers.

13. The electrical surge protection apparatus of claim 1, further including a reactive load coupled to one of a pair of outputs of the second of the pair of quadrature couplers.

14. An electrical surge protection circuit, comprising:

a first ground plane;

a first dielectric sheet adjacent to the first ground plane;

a first electrical stripline having a U shape with a first lead extending from a tip of the U shape and a second lead extending from a second tip of the U shape, the first electrical stripline adjacent to the first dielectric sheet and the first lead extending beyond a first edge of the first dielectric sheet and a second lead extending beyond a second edge of the first dielectric sheet;

a second dielectric sheet adjacent to the first electrical stripline;

a second electrical stripline having an inverted U shape having a first lead extending from a first tip of the inverted U shape and a second lead extending from a second tip of the inverted U shape, the first lead extending beyond a first edge of the second dielectric sheet and the second lead extending beyond a second edge of the second electrical stripline, the second electrical stripline adjacent to the second dielectric sheet;

a third dielectric sheet adjacent to the second electrical stripline; and a second ground plane adjacent to the third dielectric sheet.

15. The electrical surge protection circuit of claim 14, further including a quarter wave stub electrically connected to a first lead of the first electrical stripline, the quarter wave stub between the first dielectric sheet and the second dielectric sheet.

16. The electrical surge protection circuit of claim 14, further including a first quarter wave stub connected to a base of the U of the first electrical stripline and a second quarter wave stub connected to a base of the inverted U of the second electrical stripline.

17. The electrical surge protection circuit of claim 14, further including a voltage breakdown device electrically connected between the first ground plane and a first lead of the first electrical stripline, the voltage breakdown device between the first dielectric sheet and the second dielectric sheet.

18. The electrical surge protection circuit of claim 14, further including a first voltage breakdown device connected to a base of the U shape of the first electrical stripline and a second voltage breakdown device connected to a base of the inverted U shape of the second electrical stripline.

* * * * *